United States Patent [19]
Ichikawa et al.

[11] Patent Number: 5,634,699
[45] Date of Patent: Jun. 3, 1997

[54] ANTI-SKID CONTROL SYSTEM FOR A FOUR-WHEEL DRIVE VEHICLE

[75] Inventors: Hiroyuki Ichikawa, Okazaki; Kenji Tanaka, Anjo, both of Japan

[73] Assignee: Aisin Seiki Kabushiki Kaisha, Kariya, Japan

[21] Appl. No.: 545,334

[22] Filed: Oct. 19, 1995

[30] Foreign Application Priority Data

Oct. 20, 1994 [JP] Japan .................................. 6-283014

[51] Int. Cl.$^6$ ..................................................... B60T 8/58
[52] U.S. Cl. ........................... 303/150; 303/190; 303/186
[58] Field of Search .................................. 303/150, 190, 303/187, 186, 143; 364/426.02, 426.03

[56] References Cited

U.S. PATENT DOCUMENTS

| | | | |
|---|---|---|---|
| 4,813,266 | 3/1989 | Nash | 364/556 |
| 5,171,070 | 12/1992 | Okazaki et al. | 303/176 |
| 5,419,624 | 5/1995 | Adler et al. | 303/141 X |
| 5,443,583 | 8/1995 | Sugawara et al. | 303/169 |

FOREIGN PATENT DOCUMENTS

| | | |
|---|---|---|
| 60-35647 | 2/1985 | Japan . |
| 3-208758 | 9/1991 | Japan . |
| 5-131912 | 5/1993 | Japan . |

*Primary Examiner*—Lee W. Young
*Attorney, Agent, or Firm*—Burns, Doane, Swecker & Mathis, LLP

[57] ABSTRACT

The invention is directed to an arrangement for controlling a braking force applied to each of front and rear road wheels of a four-wheel drive vehicle depending upon a braking condition, with a hydraulic braking pressure supplied to each of the wheel brake cylinders through an actuator. The actuator is controlled by a braking force controller into which output signals of wheel speed sensors are fed. On the basis of the wheel speeds detected by the sensors, a wheel acceleration of each road wheel is calculated. Also, an oscillation of a relative movement between the front and rear road wheels is determined. And, a coefficient of friction of a road is estimated in accordance with the wheel acceleration and the oscillation. For example, it is estimated that the road is of a relatively low coefficient of friction, when a mean wheel acceleration of all road wheels becomes less than a predetermined standard acceleration, and when the oscillation is caused to exceed a predetermined level. Then, the hydraulic braking pressure applied to each of the wheel brake cylinders is controlled by the braking force controller in accordance with the estimated coefficient of friction and in response to each wheel speed.

5 Claims, 12 Drawing Sheets

ANTI-SKID CONTROL SYSTEM FOR A FOUR-WHEEL DRIVE VEHICLE

BACKGROUND OF THE INVENTION

1. Field of the Invention

The present invention relates to an anti-skid control system for controlling the braking force applied to each driven wheel in a braking operation of an automotive vehicle having four driven wheels to prevent each driven wheel from being locked, and more particularly to an anti-skid control system for estimating a coefficient of friction of a road surface, and controlling the braking force in accordance with the estimated coefficient of friction.

2. Description of the Prior Art

In general, an ordinary passenger vehicle has a pair of road wheels at each of its front and rear sides. Either the front road wheels or the rear road wheels of that vehicle are operatively connected with the internal combustion engine to be driven directly thereby, while the rest of the wheels are not connected with the engine so as to be served as non-driven wheels. A vehicle having the driven wheels at its front side is called a front drive vehicle, while a vehicle having the driven wheels at its rear side is called a rear drive vehicle. Whereas, a vehicle having the driven wheels at both of the front and rear sides is called a four-wheel drive (4WD) vehicle. Further, there has been provided a differential gear mechanism for compensating a difference between the rotational speeds of the right and left driven wheels so as to ensure a smooth driving of the vehicle. In other words, the right and left driven wheels are controlled by means of the differential gear mechanism such that an equal torque is transmitted to the right and left driven wheels, respectively. As for a driving system of the four-wheel drive vehicle, there are known various types of the system, such as a part time system, full time system, of the like. According to the full time system, the front driven wheels and the rear driven wheels are connected by a differential gear mechanism, i.e., so called center differential gear. Also, in order to prevent a trouble which may be caused when only either one of the driven wheels slips, a limited slip differential mechanism (LSD) is employed for limiting the differential operation and increasing the driving force, with a mechanism for generating a frictional torque, or a mechanical clutch mechanism, provided in the differential gear mechanism.

The coefficient of friction between the road surface and the road wheels is varied in dependence upon the kinds of the road wheels, the road surface condition and the like. Especially, the coefficient of friction (herein, abbreviated as CF) is varied to a large extent in dependence upon the conditions of the road on which the vehicle is running, such as a dry road surface and a wet road surface. Thus, it is very important to detect the coefficient of friction of the road surface (hereinafter, referred to as the road-CF). In this respect, when the vehicle is running, it is impossible to directly detect the road-CF. Therefore, according to an apparatus disclosed in Japanese Patent Laid-open publication No.60-35647 for example, the road-CF is determined by comparing in magnitude a wheel speed and a wheel acceleration, with a standard speed and a standard acceleration of each wheel, respectively. However, in the apparatus disclosed in that publication, the road-CF is supposed to be estimated after the pressure decreasing operation in a wheel cylinder of each road wheel has been initiated, so that the road-CF is estimated only when the hydraulic braking pressure is being controlled. Therefore, it is impossible to estimate the road-CF before the pressure decreasing operation starts.

According to a hydraulic braking system employing a proportional control electromagnetic valve as disclosed in Japanese Patent Laid-open publication No.3-208758, it has been proposed to detect the road-CF at the time of starting a braking pressure control for providing an appropriate braking pressure control at the time of starting the same in accordance with the road conditions. In practice, it is so arranged that the road-CF is estimated on the basis of an acceleration of a standard speed which is provided at the time when means for determining the necessity of the braking pressure control has determined the same to be initiated. That is, an estimated vehicle speed Vs is calculated on the basis of the maximum speed of the wheel speeds of the four road wheels before the braking pressure control is initiated, and an acceleration Vsd of the estimated vehicle speed Vs is calculated. Then, the road-CF is estimated on the basis of the acceleration Vsd thereby to provide a hydraulic braking pressure applied to each wheel cylinder.

In the above-described publication, however, the value of the hydraulic braking pressure which is provided when the braking pressure control is initiated, is unknown, and the road-CF which is estimated on the basis of a variation of the estimated vehicle speed Vs per a certain period of time, can not be estimated, if all the road wheels are locked simultaneously. In order to solve this problem, an anti-skid control apparatus has been proposed in Japanese Patent Laid-open publication No.5-131912. This apparatus includes means for calculating the variation of the estimated vehicle speed per a certain period of time, means for estimating the coefficient of friction of the road by comparing the variation with a predetermined value, braking force control means for controlling an actuator in accordance with at least an estimated result of the coefficient of friction estimation means to control the hydraulic braking pressure fed to a wheel cylinder thereby to control the braking force applied to a road wheel, and means for adjusting the value of the coefficient of friction. This adjusting means is arranged to prevent the variation calculation means from calculating the variation of the estimated vehicle speed, when the variation has exceeded a predetermined value more than a predetermined number of times in a predetermined period of time before the braking pressure control is initiated by the braking force control means, whereby the coefficient of friction can be estimated, even if all of the road wheels are locked simultaneously. However, according to the apparatus disclosed in the publication No.5-131912, if the braking force is gradually applied to the road wheel for example, the wheel speed will be also gradually decreased, so that it is difficult to detect the locking condition of the road wheel until the wheel speed is decreased to a relatively low speed. Therefore, the anti-skid control operation might be delayed thereby to cause all of the road wheels to be locked simultaneously. According to the conventional anti-skid control apparatus, the braking control system is provided for controlling the vehicle running on a road of a relatively high coefficient of friction (hereinafter, referred to as high-CF) when the anti-skid control is initiated. Therefore, if the gradual braking operation is made on a road of a relatively low coefficient of friction (hereinafter, referred to as low-CF), the wheel speeds of all the road wheels will be immediately decreased. Or, if the estimated vehicle speed is provided on the basis of the maximum wheel speed, for example, to perform the braking force control, the estimated vehicle speed will be rapidly decreased, with the wheel speed decreased, to be far from the actual vehicle speed.

Generally, when a running vehicle is braked, the axle loads which are applied to the front and rear portions of the vehicle respectively, will be different from each other due to the moving load caused by the braking operation. Therefore, the braking force applied to a front road wheel and the braking force applied to a rear road wheel for locking all the road wheels simultaneously are not in direct proportion to each other, but in such a relationship as called an ideal braking force distribution, which varies depending upon the condition with or without load. If the braking force applied to the rear road wheel exceeds the braking force applied to the front road wheel, the directional stability of the vehicle will be deteriorated. In order to keep the braking force applied to the rear road wheel lower than that applied to the front road wheel and provide a distribution in close proximity to the ideal braking force distribution, a proportioning valve is provided between the rear wheel brake cylinder and the master cylinder, so that the braking force applied to the rear road wheel is generally set to be lower than the braking force applied to the front road wheel. Therefore, when the braking force is applied to the front and rear road wheels simultaneously, the front road wheel is likely to be locked in advance. This is irrelevant to the road surface conditions.

However, in the case where the rear road wheel is connected with the front road wheel through the engine as in the full time four-wheel drive vehicle, the wheel speed is caused to vary in a peculiar fashion, as explained below.

In general, the equation of motion of each road wheel on a road surface is as follows:

$$Im \times Ar = CF \times W \times R - Tb$$

where "Im" is an inertia moment of a rotational system of a tire, "Tb" is a braking torque, "Ar" is an angular acceleration of a road wheel, "W" is a load of a tire, and "R" is a radius of the tire. "x" designates multiplication. In such a four-wheel drive vehicle as shown in FIG. 14, wherein its front road wheels and rear road wheels are operatively connected to an engine and a mission (shown as EG) through a center differential gear CD, a torsion is caused on a propeller shaft PS which transmits the driving force from the front road wheels to the rear road wheels. Therefore, the equation of motion which is applied to the case where a torque Td at the rear side (i.e., the torque of a rear differential gear RD) is transmitted to the center differential gear CD, i.e., a simulation model equation for the transmission of the torque as viewed from the driving side, is as follows:

$$Ip \times np = Tp - Td, \text{ and}$$

$$Td = Cp \, (np-nd) + Kp \, (Ap-Ad)$$

where "Ip" is an inertia moment of a rotational system including the propeller shaft PS, "Tp" is a torque of the propeller shaft PS, "np" is a rotational speed of the propeller shaft PS, "nd" is a rotational speed of the rear differential gear RD, "Cp" is a torsion damping coefficient, "Kp" is a torsional rigidity, "Ap" is an angle of rotation of the propeller shaft PS, and "Ad" is the angle of rotation of the rear differential gear RD. Thus, the torque is transmitted to the center differential gear CD, with a displacement of the propeller shaft caused by the torsion.

In the case where such a four-wheel drive vehicle as shown in FIG. 14 is running on a road surface of a relatively low coefficient of friction (low-CF), and where the coefficient of friction between the tire and the road surface decreases after it reached its peak value, the wheel acceleration is greatly decreased, because the inertia moment of the tire in its rotating direction is smaller than the inertia moment of the propeller shaft PS associated with the center differential gear CD. On the contrary, the inertia of the propeller shaft PS is relatively large. Therefore, a rotational speed differential (rotational angular differential) is caused between the rotational speed (np) of the propeller shaft PS and the rotational speed (nd) of the rear differential gear RD. In accordance with the rotational speed differential, the torque is transmitted to the propeller shaft PS so as to decrease the rotational speed of the propeller shaft PS. However, since the inertia of the propeller shaft PS is relatively large, the rotational speed of the propeller shaft PS is not decreased so much, whereas the torque is provided by its reaction to rotate the tire (in a direction for reducing the braking torque). Consequently, the wheel speed, which once tended to be decreased, tends to gain the speed again, thereby to cause a vibration or oscillation of the speed. In this connection, although the oscillation is caused when the vehicle is braked on the road surface of a relatively high coefficient of friction (high-CF), even if the braking torque is decreased by the reaction force, the tire torque is relatively large on that road surface. Therefore, the motion of the vehicle is not so much affected by the coefficient of friction of the road surface, until its position in the coefficient of friction vs slip rate characteristic comes to be located in such a region as being almost flat to reach the peak region. Accordingly, it is possible to distinguish the road conditions of the high-CF and the low-CF, on the basis of the oscillating state of the wheel speed differential between the rotational speed of the road wheel running on the high-CF road and that of the road wheel running on the low-CF road.

FIG. 15 illustrates the conditions during the gradual braking operation in the above-described four-wheel drive vehicle, and illustrates variations of a mean or average wheel speed of the front driven road wheels (hereinafter, referred to as front wheels) Vfa (hereinafter, referred to as a front mean speed Vfa), and a mean wheel speed of the rear driven road wheels (rear wheels) Vra (a rear mean speed Vra), in the case where the vehicle is running on the road surface of the low-CF as shown in the upper section of FIG. 15, and where the vehicle is running on the road surface of the high-CF as shown in the lower section of FIG. 15. On the low-CF road, when all of the road wheels are braked, the front mean speed Vfa is decreased in advance as shown by a phantom line. Then, the rear mean speed Vra is decreased as shown by a solid line, and at the same time the front mean speed Vfa is once increased. Thereafter, the front and rear mean speeds Vfa, Vra are decreased varying respectively to generate an oscillation of the speed differential between the front and rear mean speeds Vfa and Vra. On the high-CF road surface, however, as shown in the lower section in FIG. 15, the front and rear mean speeds Vfa, Vra are decreased in substantially the same fashion. Comparing the upper section with the lower section in FIG. 15, therefore, if it is possible to determine the characteristic in which the front and rear mean speeds Vfa, Vra are decreased varying respectively, the road surface could be estimated to be of the low-CF, at least.

SUMMARY OF THE INVENTION

Accordingly, it is an object of the present invention to provide an anti-skid control system for a four-wheel drive vehicle wherein a coefficient of friction of a road surface is properly estimated before a braking pressure control is initiated, by simply detecting the wheel speeds of road wheels, even in the case where all of the road wheels tend to be locked simultaneously when they are braked.

In accomplishing the above and other objects, an anti-skid control system which controls a braking force applied to front and rear road wheels of a four-wheel drive vehicle comprises wheel brake cylinders which are operatively connected to the front and rear road wheels, respectively, for applying braking force thereto, a hydraulic pressure generator for supplying a hydraulic braking pressure to each of the wheel brake cylinders, actuating means which is disposed in each hydraulic circuit communicating the hydraulic pressure generator with each of the wheel brake cylinders for controlling the hydraulic braking pressure in each of the wheel brake cylinders, and wheel speed detection means for detecting wheel speeds of the front and rear road wheels, and providing output signals corresponding to the wheel speeds, respectively. The anti-skid control system is provided with wheel acceleration calculation means for calculating an acceleration of each road wheel on the basis of the wheel speeds detected by the wheel speed detection means, oscillation determination means for determining an oscillation of a relative movement between the front road wheels and the rear road wheels on the basis of the wheel speeds detected by the wheel speed detection means, and coefficient of friction estimation means for estimating a coefficient of friction of a road on which the vehicle is running, in accordance with the output of the acceleration means and the result of the oscillation determination means. And, the braking force control means is provided for controlling the actuating means in accordance with at least the coefficient of friction estimated by the coefficient of friction estimation means, and in response to the wheel speeds detected by the wheel speed detection means, thereby to control the braking force applied to each of the road wheels.

In the above-described anti-skid control system, mean acceleration calculation means is preferably provided for calculating a mean value of the wheel accelerations for all of the road wheels obtained by the wheel acceleration calculation means, to provide a mean acceleration. Then, the coefficient of friction estimation means estimates that the coefficient of friction of the road is relatively low, when the mean wheel acceleration calculated by the mean acceleration calculation means becomes less than a predetermined standard acceleration, and when the oscillation determination means determines that the oscillation is caused to exceed a predetermined level.

Preferably, front and rear mean speed calculation means may be provided for calculating a front mean speed and a rear mean speed, respectively, on the basis of the wheel speeds detected by the wheel speed detection means. Then, speed differential calculation means may be provided for calculating a wheel speed differential between the front mean speed and the rear mean speed, and band-pass filter means may also be provided for passing the wheel speed differential having an oscillation property within a predetermined band of frequencies, out of the wheel speed differentials calculated by the speed differential calculation means. Then, the coefficient of friction estimation means estimates that the coefficient of friction of the road is relatively low, when the mean wheel acceleration calculated by the mean acceleration calculation means becomes less than a predetermined standard acceleration, and when the oscillation determination means determines that the wheel speed differential passed the band-pass filter means exceeds a predetermined value, and that the frequency of oscillation of the wheel speed differential exceeds a predetermined frequency during a predetermined period.

Preferably, first and second band-pass filter means may be provided for passing the front and rear mean accelerations having an oscillation property within a predetermined band of frequencies, out of the front and rear mean accelerations calculated, respectively. Then, it may be preferable to arrange that the coefficient of friction estimation means estimates that the coefficient of friction of the road is relatively low, when the mean wheel acceleration becomes less than a predetermined standard acceleration, and the oscillation determination means determines that the front and rear mean accelerations passed the first and second band-pass filter means exceed the predetermined values, respectively, and that the frequencies of oscillations of the front and rear mean accelerations exceed the predetermined frequencies during a predetermined period, respectively.

BRIEF DESCRIPTION OF THE DRAWINGS

The above stated objects and following description will become readily apparent with reference to the accompanying drawings, wherein like reference numerals denote like elements, and in which.

DESCRIPTION OF THE PREFERRED EMBODIMENTS

Figure 1:
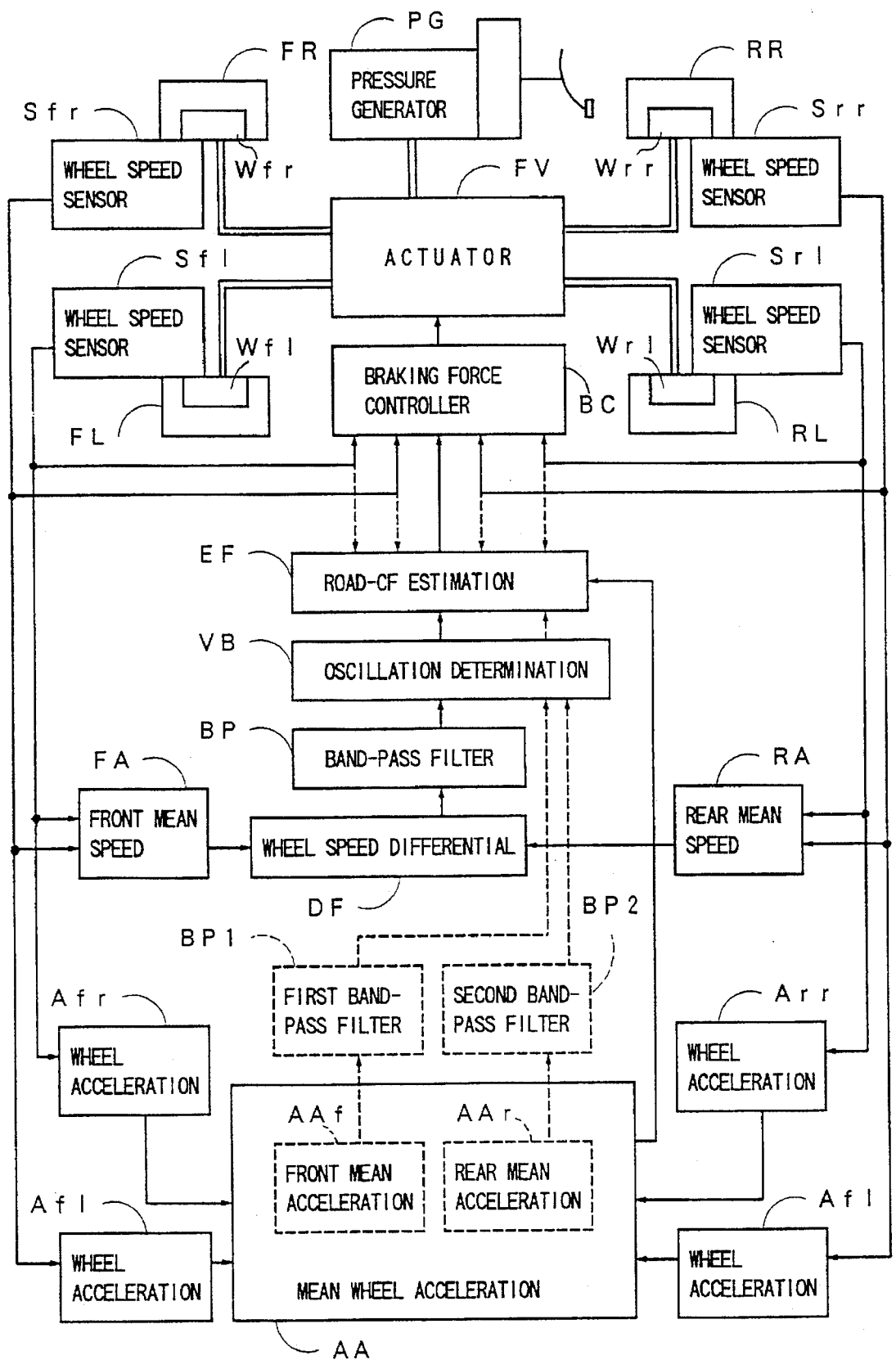
FIG. 1 is a general block diagram illustrating an anti-skid control system according to the present invention.

Referring to FIG. 1, there is schematically illustrated an anti-skid control system according to the present invention, which controls a braking force applied to each of the front road wheels FR, FL and rear road wheels RR, RL of a vehicle depending upon a braking condition. In this anti-skid control system, it is so arranged that when the hydraulic pressure generator PG is operated, a hydraulic braking pressure is supplied from the pressure generator PG to each of the wheel brake cylinders Wfr, Wfl, Wrr, Wrl through an actuator FV, so that a braking force is applied to each of the road wheels FR, FL and RR, RL. And, wheel speeds of the front and rear road wheels FR, FL and RR, RL are detected by wheel speed sensors Sfr, Sfl, Srr, Srl, respectively. On the basis of those wheel speeds detected by the wheel speed sensors, an acceleration of each road wheel is calculated by each of the wheel acceleration calculation units Afr, Afl, Arr, Arl. A mean value of the wheel accelerations for all of the road wheels (a mean wheel acceleration) is calculated by the mean acceleration calculation unit AA. A mean value of the wheel speeds of the front road wheels FR, FL (a front mean speed) is calculated by a front wheel speed calculation unit FA on the basis of the wheel speeds detected by the wheel speed sensors Sfr, Sfl. Also, a mean value of the wheel speeds of the rear road wheels RR, RL (a rear mean speed) is calculated by a rear wheel speed calculation unit RA on the basis of the wheel speeds detected by the wheel speed sensors Srr, Srl. Then, a speed differential between the results of the calculation of the wheel speed calculation units FA and RA is calculated by a speed differential calculation unit DF. A band-pass filter BP is provided for passing the wheel speed differential having an oscillation property within a predetermined band of frequencies, out of the wheel speed differentials calculated by the speed differential calculation unit DF. And, an oscillation determination unit VB is provided for determining the state of the wheel speed differential passed through the band-pass filter BP. Furthermore, a coefficient of friction estimation unit EF (hereinafter, referred to as road-CF estimation unit EF) is provided for estimating a coefficient of friction of a road on which the vehicle is running. The unit EF estimates that the road is of a relatively low coefficient of friction, when the mean wheel acceleration calculated by the mean acceleration calculation unit AA becomes less than a predetermined standard acceleration, and when the oscillation determination unit VB determines that the wheel speed differential passed through the band-pass filter BP exceeds a predetermined value, and that the frequency of oscillation of the wheel speed differential exceeds a predetermined frequency during a predetermined period. The braking force controller BC is provided for controlling the actuator FV in accordance with at least the coefficient of friction estimated by the road-CF estimation unit EF, and in response to the wheel speeds detected by the wheel speed sensors, so that the braking force applied to each of the road wheels is controlled effectively.

As indicated by phantom lines in FIG. 1, the system may include a front mean acceleration calculation unit AAf which calculates a mean value of the wheel accelerations of the front road wheels FR, FL calculated by the wheel acceleration calculation units Afr, Afl, to provide a front mean acceleration, and a rear mean acceleration calculation unit AAr which calculates a mean value of the wheel accelerations of the rear road wheels RR, RL calculated by the wheel acceleration calculation units Arr, Arl, to provide a rear mean acceleration. A first band-pass filter BP1 is provided for passing the front mean acceleration having an oscillation property within a predetermined band of frequencies, out of the front mean accelerations calculated by the front mean acceleration calculation unit AAf. Also, a second band-pass filter BP2 is provided for passing the rear mean acceleration having an oscillation property within a predetermined band of frequencies, out of the rear mean accelerations calculated by the rear mean acceleration calculation unit AAr. Accordingly, the coefficient of friction estimation unit EF is adapted to estimate that the coefficient of friction of the road is relatively low, when the output of the mean acceleration calculation unit AA becomes less than a predetermined standard acceleration, and when the oscillation determination unit VB determines that the front and rear mean accelerations passed through the first and second band-pass filters BP1, BP2 exceed the predetermined values, respectively, and the frequencies of oscillations of the front and rear mean accelerations exceed the predetermined frequencies during a predetermined period, respectively.

Figure 2:
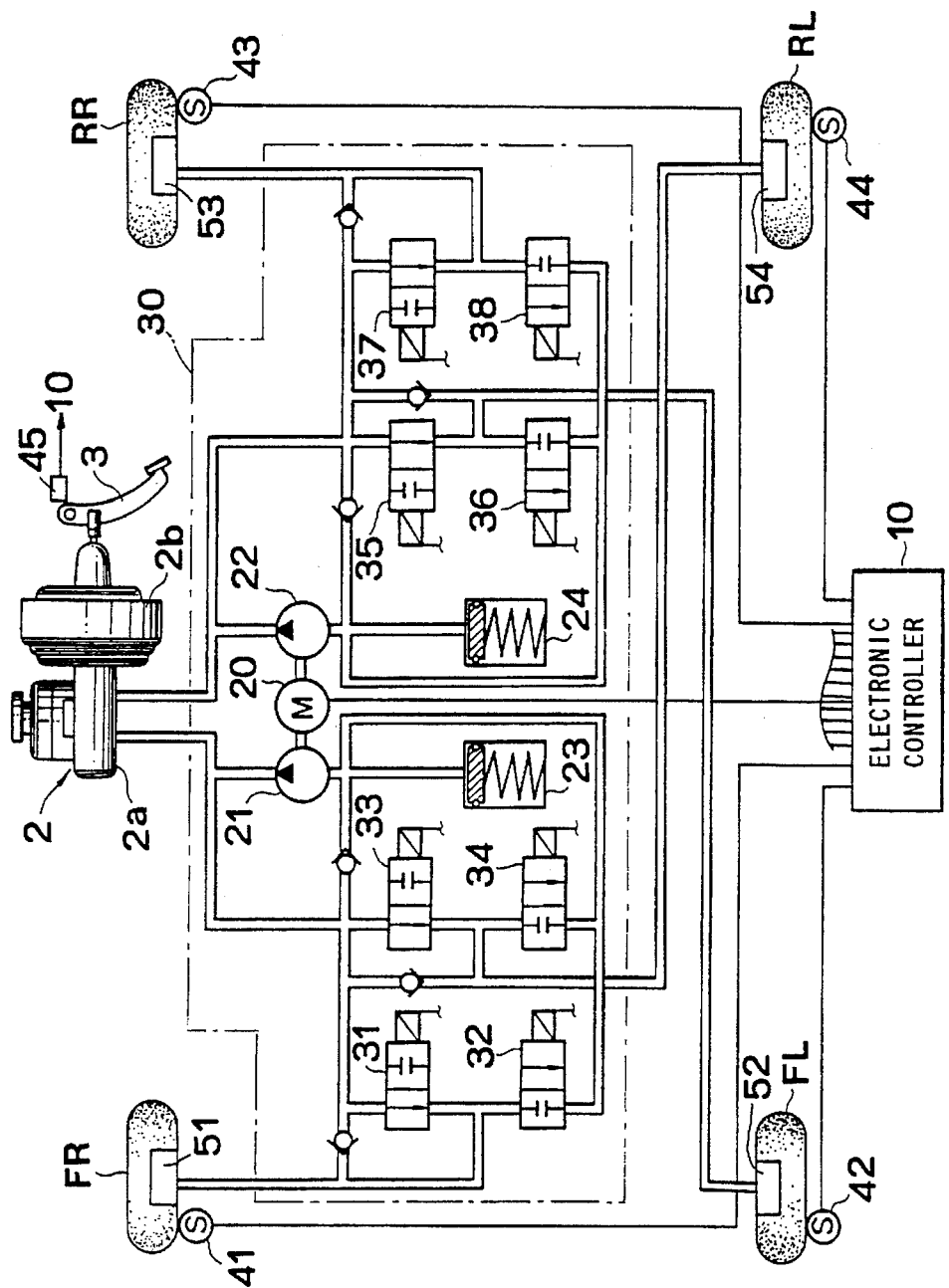
FIG. 2 is a schematic block diagram of an anti-skid control system of an embodiment of the present invention.

More specifically, an embodiment of the present invention is illustrated in FIGS. 2 to 10. Referring to FIG. 2, pumps 21, 22, reservoirs 23, 24 and solenoid valves 31 to 38 are disposed in hydraulic circuits for connecting a hydraulic pressure generator 2, which comprises a master cylinder 2a and a booster 2b operated in response to a depression of a brake pedal 3, to wheel brake cylinders 51 to 54 operatively connected to the road wheels FR, FL, RR and RL, respectively. The road wheel FR designates a road wheel at the fore right side as viewed from the position of a driver's seat, the road wheel FL designates a road wheel at the fore left side, the road wheel RR designates a road wheel at the rear right side, and the road wheel RL designates a road wheel at the rear left side. In the present embodiment, the rear road wheels RR, RL are connected with the front road wheels FR, FL through a so-called center differential gear (not shown), so that all the road wheels are driven wheels to provide a 4WD (four-wheel drive) system. With respect to a braking system, a diagonal hydraulic dual circuits system has been formed as shown in FIG. 2.

Between the hydraulic pressure generator 2 and wheel brake cylinders 51 to 54, there is disposed an actuator 30 which corresponds to the actuator FV in FIG. 1. The actuator 30 includes the solenoid valves 31, 32 and solenoid valves 33, 34 which are disposed respectively in the hydraulic circuits for connecting one output port of the master cylinder 2a to the wheel brake cylinders 51, 54, and the pump 21 which is disposed between the master cylinder 2a and the solenoid valves 31 to 34. Similarly, the solenoid valves 35, 36 and solenoid valves 37, 38 are disposed respectively in the hydraulic circuits for connecting the other output port of the master cylinder 2a to the wheel brake cylinders 52, 53, and the pump 22 is disposed between the master cylinder 2a and the solenoid valves 35 to 38. The pumps 21, 22 are driven by an electric motor 20, so that the brake fluid raised to a predetermined pressure is supplied to these hydraulic circuits. Accordingly, these hydraulic circuits serve as the circuits through which the hydraulic braking pressure is supplied to the normally open solenoid valves 31, 33, 35 and 37. The hydraulic circuits at the drain side of the normally closed solenoid valves 32, 34 are connected to the pump 21 and the reservoir 23 as well, and the hydraulic circuits at the drain side of the solenoid valves 36, 38 are connected to the pump 22 and the reservoir 24 as well. Each of the reservoirs 23, 24 is provided with a piston and a spring, and functions so as to store the brake fluid returned from each of the solenoid valves 32, 34, 36 and 38 through the hydraulic circuits at the drain side thereof, and to supply the brake fluid to each of those solenoid valves when the pumps 21, 22 operate.

Each of the solenoid valves 31 to 38 is a two-port two-position solenoid operated changeover valve, and is in its first operating position as shown in FIG. 2 when a current is not fed to its solenoid coil, so that each of the wheel brake cylinders 51 to 54 is communicated with the hydraulic pressure generator 2 and the pump 21 or 22. When the current is fed to the solenoid coil, each solenoid valve is changed over to its second operating position, so that each of the wheel brake cylinders 51 to 54 is shut off from the communication with the hydraulic pressure generator 2 and the pump 21 or 22, and is communicated with the reservoir 23 or 24. Check valves shown in FIG. 2 permit the brake fluid to return from each of the wheel brake cylinders 51 to 54 and the reservoirs 23, 24 to the hydraulic pressure generator 2, and blocks the counterflow of the brake fluid.

Accordingly, with each of the solenoid valves 31 to 38 energized or de-energized, the hydraulic braking pressure in each of the wheel brake cylinders 51 to 54 is decreased, held or increased. Namely, when the current is not fed to the solenoid coil of each of the solenoid valves 31 to 38, the hydraulic braking pressure is supplied from the hydraulic pressure generator 2 and the pump 21 or 22 to each of the wheel brake cylinders 51 to 54 to increase the hydraulic braking pressure in each wheel brake cylinder. On the other hand, when the current is fed to the solenoid coil, each of the wheel brake cylinders 51 to 54 is communicated with the reservoir 23 or 24 to decrease the hydraulic braking pressure in each wheel brake cylinder. Further, when the current is fed only to the solenoid coils of the solenoid valves 31, 33, 35 and 37, the hydraulic braking pressure in each wheel brake cylinder is held. Therefore, by adjusting the time intervals of energization and de-energization of the solenoid valves, it is possible to provide a so-called pulse-increase mode (step-increase mode) or a pulse-decrease mode so as to gradually increase or decrease the hydraulic braking pressure.

The above-described solenoid valves 31 to 38 are electrically connected to the electronic controller 10 which controls the operation of the solenoid valves 31 to 38. The electric motor 20 is also connected to the electronic controller 10, so that the operation of the electric motor 20 is controlled by the electronic controller 10. At the road wheels FR, FL, RR and RL, there are provided wheel speed sensors 41 to 44 respectively, which are connected to the electronic controller 10, and by which a signal corresponding to a rotational speed of each road wheel, i.e., a wheel speed signal is fed to the electronic controller 10. Each of the wheel speed sensors 41 to 44 in the present embodiment is a well known sensor of the electromagnetic induction type which comprises a pick-up having a coil wound around a permanent magnet and a rotor having an outer peripheral end thereof provided with teeth, and functions to output a voltage with a frequency proportional to the rotational speed of each road wheel, while other types of sensor may be used, instead of the above-described sensor. There is also provided a brake switch 45 which is turned on when the brake pedal 3 is depressed, and turned off when the brake pedal 3 is released, and which is electrically connected to the electronic controller 10.

Figure 3:
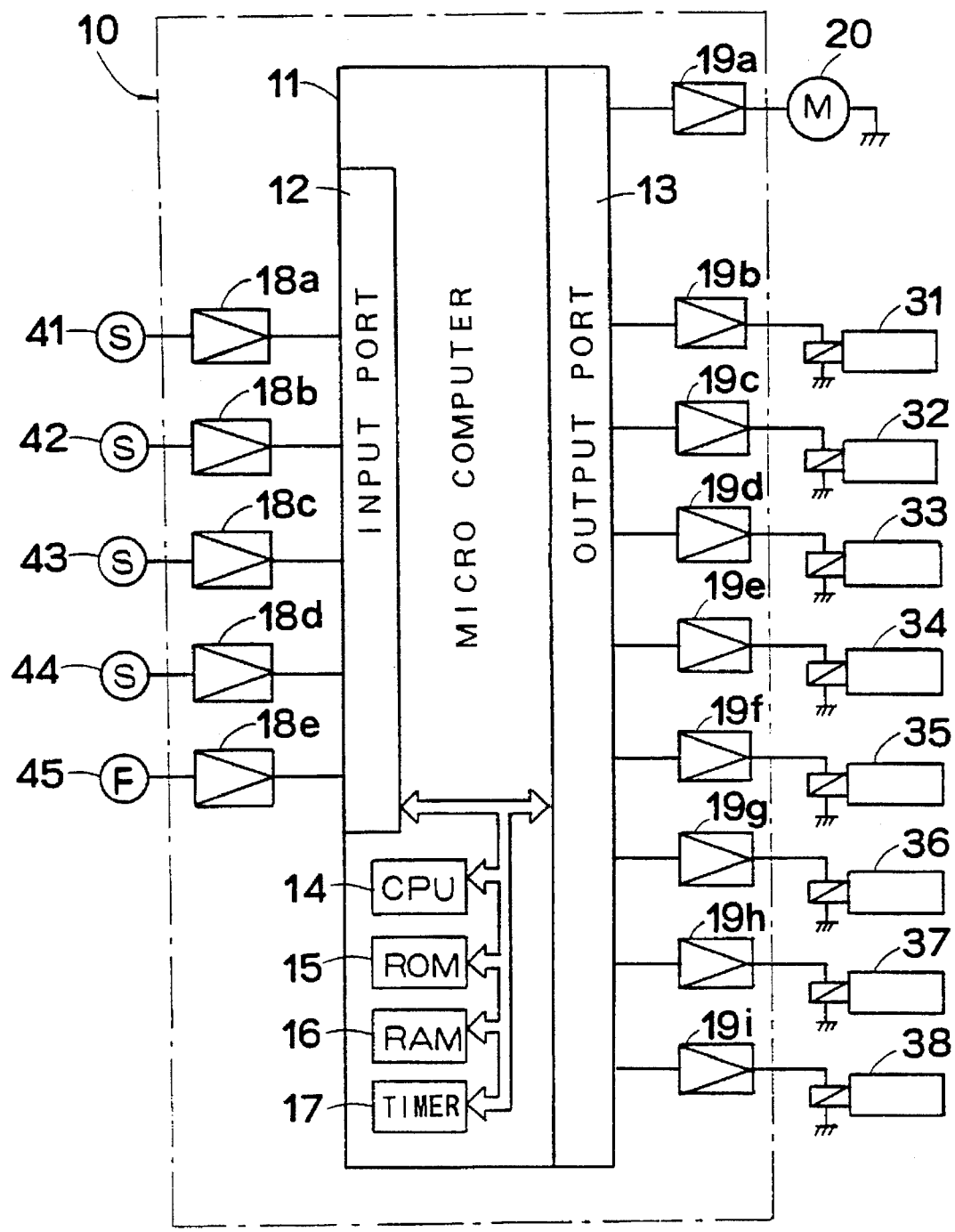
FIG. 3 is a block diagram illustrating the arrangement of an electronic controller shown in FIG. 2.

As shown in FIG. 3, the electronic controller 10 is provided with a microcomputer 11 having a central processing unit or CPU 14, a read-only memory or ROM 15, a random access memory or RAM 16 and a timer 17, which are connected with an input port 12 and an output port 13 via a common bus to execute the input/output operations relative to external circuits. The signals detected by each of the wheel speed sensors 41 to 44 and the brake switch 45 are fed to the input port 12 via respective amplification circuits 18a to 18e and then to the CPU 14. Then, a control signal is output from the output port 13 to the electric motor 20 via a drive circuit 19a, and control signals are fed to the solenoid valves 31 to 38 via the respective drive circuits 19b to 19i. In the microcomputer 11, the ROM 15 memorizes a program corresponding to flowcharts shown in FIGS. 4 to 10, the CPU 14 executes the program while the ignition switch (not shown) is closed, and the RAM 16 temporarily memorizes variable data necessary for executing the program. Furthermore, in the microcomputer 11, a band-pass filter is formed so as to serve as the band-pass filter means according to the present invention.

Figure 4:
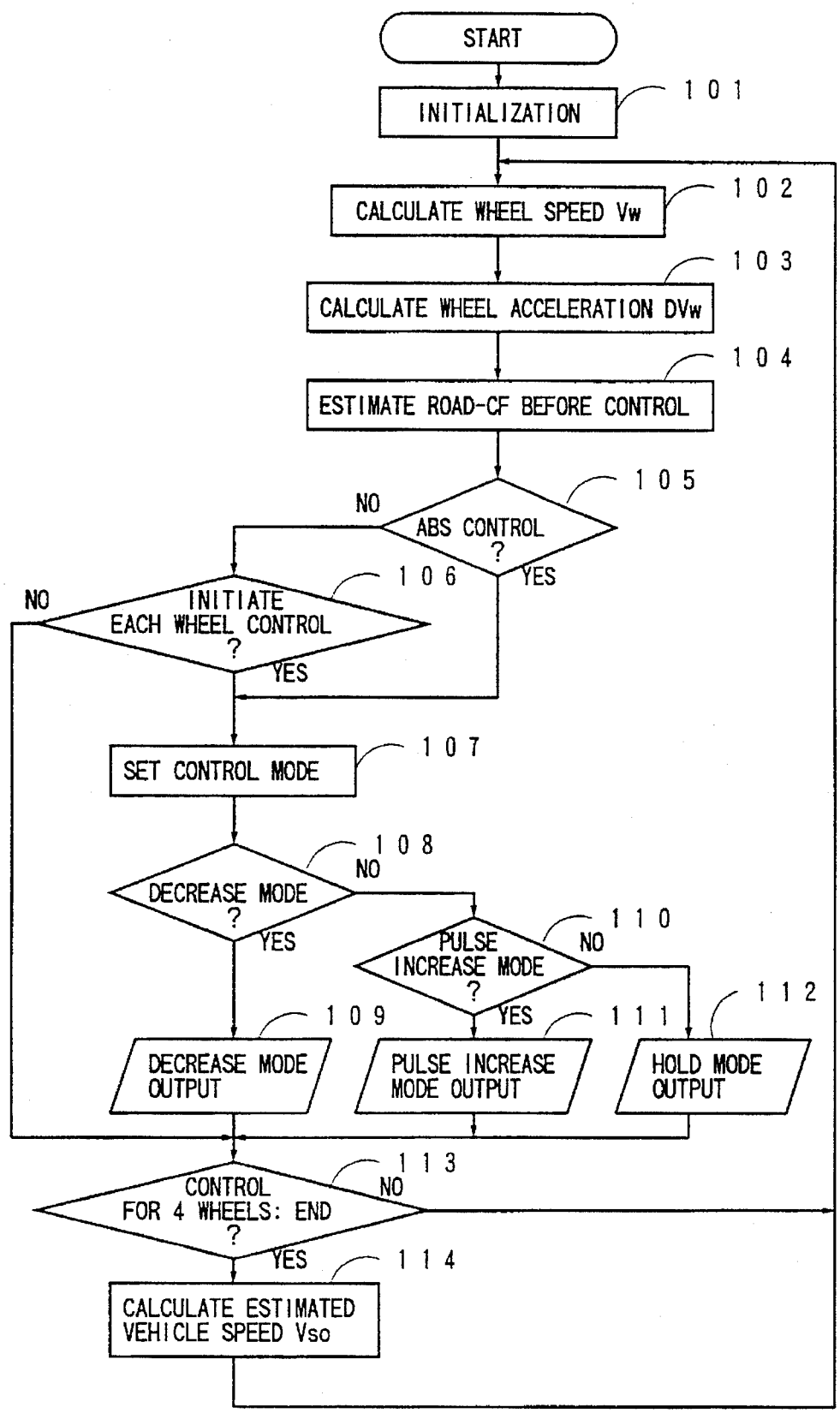
FIG. 4 is a flowchart showing the operation of the braking force control of the electronic controller according to the above embodiment of the present invention.

A program routine executed by the electronic controller 10 for the anti-skid control will now be described with reference to FIGS. 4-10. FIG. 4 is a flowchart showing a main routine executed in accordance with a program of one embodiment of the present invention. The program routine corresponding to the flowcharts as shown in FIGS. 4-10 starts when an ignition switch (not shown) is turned on, and provides for initialization of the system at Step 101 to clear various data such as a wheel speed Vw, a wheel acceleration DVw or the like. At Step 102, the wheel speed Vw is calculated in accordance with the output signal from each of the wheel speed sensors 41 to 44, and then the wheel acceleration DVw is calculated from the wheel speed Vw at Step 103. Next, at Step 104, a coefficient of friction of a road surface is estimated before an anti-skid control is initiated, so that either a high-CF or a low-CF is selected for the coefficient of friction (CF) of the road surface on which the vehicle is running, as described in detail later with reference to FIG. 6.

Then, the program proceeds to Step 105 where it is determined whether each of the road wheels is under the anti-skid control (abbreviated as ABS control as shown in FIG. 4), or not. If it is determined that the anti-skid control is being made, the program proceeds to Step 107, otherwise the program proceeds to Step 106, where it is determined whether the conditions for initiating the anti-skid control are fulfilled or not. If it is determined that the conditions have not been fulfilled, the program jumps to Step 113. In Step 107, on the basis of the braking conditions determined by the wheel speed Vw, the wheel acceleration DVw and an estimated vehicle speed Vso which will be described later, and the coefficient of friction of the road surface estimated at Step 104, one of a decrease mode, hold mode, pulse-increase mode and increase mode is selected. The coefficient of friction (CF) of the road surface is selected in accordance with the result estimated at Step 104 before the anti-skid control is initiated, as described above. However, one of the high-CF, mid-CF and low-CF is selected in response to a slip rate, for example, after the anti-skid control was initiated. And, at Step 108, it is determined if the selected control mode is the decrease mode. If so, the program proceeds to Step 109 where a decrease mode signal is output. Otherwise, the program proceeds to Step 110 where it is determined if the selected control mode is the pulse-increase mode, and if so, the program proceeds to Step 111, where the pulse-increase mode signal for alternately increasing and decreasing the hydraulic braking pressure is output, thereby to increase the hydraulic braking pressure in the wheel brake cylinder under control, out of the wheel brake cylinders 51 to 54, gradually. If the control mode is not the pulse-increase mode, the program proceeds to Step 112 where the hold mode signal is output, thereby to hold the hydraulic braking pressure in the wheel brake cylinder (hereinafter, simply referred to as the wheel cylinder pressure).

The above-described steps for selecting the control mode and producing the output signals are executed for each wheel cylinder. Then, at Step 113, it is determined whether the steps have been executed with respect to all of the four wheels FR, FL, RR, RL, and the above-described routine is repeated until the ABS control is executed with respect to all of the road wheels. Thereafter, the program proceeds to Step 114, where the estimated vehicle speed Vso is calculated and then returns to Step 102.

Figure 5:
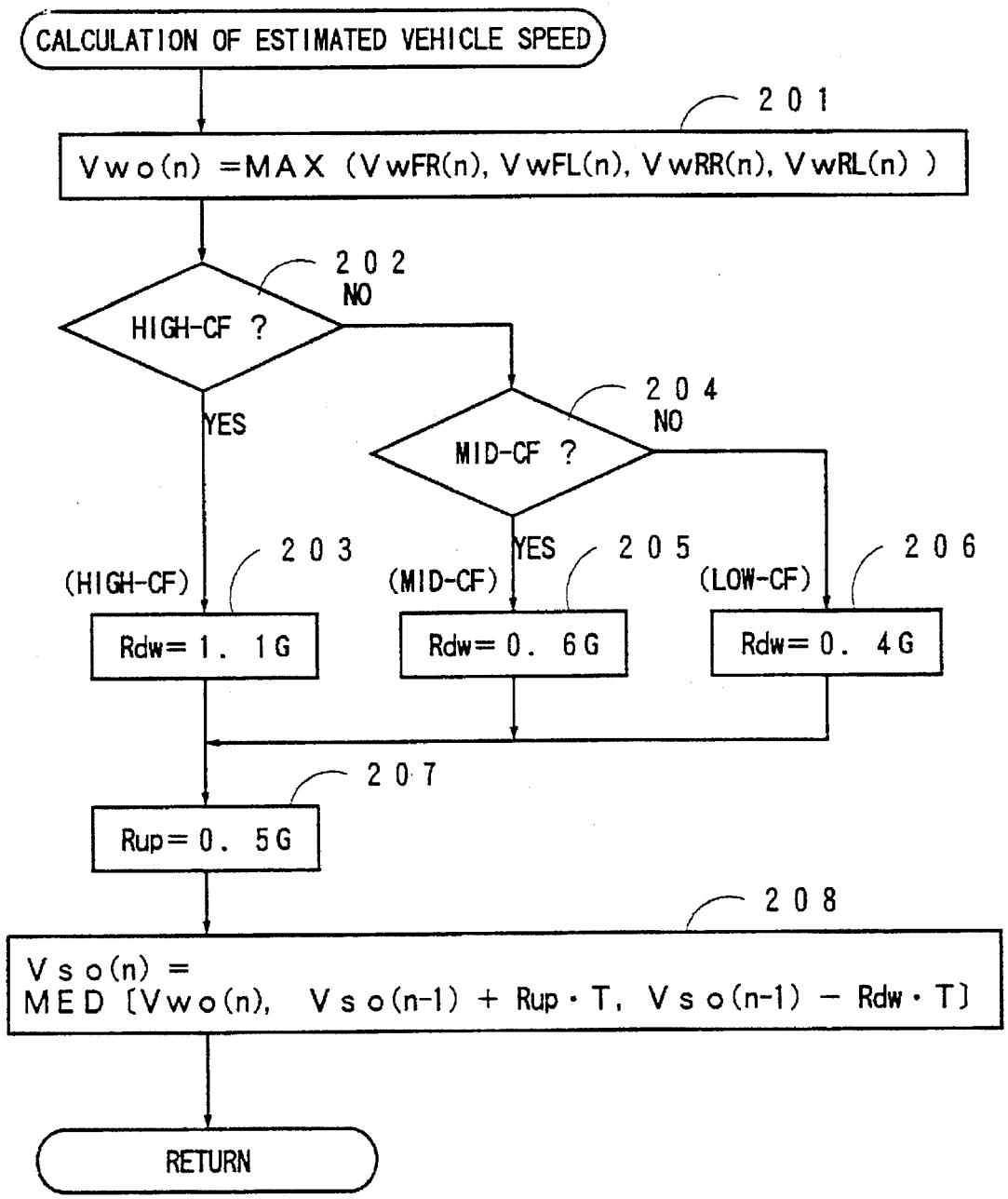
FIG. 5 is a flowchart showing the calculation of the estimated vehicle speed according to the above embodiment of the present invention.

The estimated vehicle speed Vso is calculated according to the flowchart as shown in FIG. 5 as follows. At the outset, the maximum value of the wheel speeds VwFR(n) etc. of the four road wheels is calculated at Step 201 every control cycle, e.g., 5 milliseconds to provide the maximum wheel speed Vwo(n). In FIG. 5, "MAX" designates a function for calculating the maximum value of various data, and "FR" or the like designates the wheel on which the wheel speed was calculated. "(n)" designates the value which was obtained at the n'th cycle, wherein "n" is an integer which is equal to or more than one. Then, the program proceeds to Step 202 where the coefficient of friction of the road on which the vehicle is running is determined. If the coefficient of friction of the road (the road-CF) is determined to correspond to a relatively high value of the coefficient of friction (i.e., a high-CF), the program proceeds to Step 203 where a deceleration Rdw is set to a predetermined value, e.g., 1.1 G (wherein "G" represents a gravity acceleration). If it is determined that the road-CF does not correspond to the high-CF, the program proceeds to Step 204 where it is determined if the road-CF corresponds to a mid-CF. If the road-CF corresponds to the mid-CF, the program proceeds to Step 205 where the deceleration Rdw is set to 0.6 G for example, otherwise the program proceeds to Step 206 where the road-CF is determined to correspond to the low-CF, so that the deceleration Rdw is set to 0.4 G for example. Thereafter, the program proceeds to Step 207 where the acceleration Rup is set to 0.5 G for example, and further proceeds to Step 208 where the estimated vehicle speed Vso(n) is calculated. That is, the intermediate or middle value is selected to provide the estimated vehicle speed Vso(n), out of the maximum wheel speed Vwo(n) obtained at Step 201, the estimated vehicle speed Vso(n−1) at the previous cycle with the value obtained by multiplying the acceleration Rup and the cycle period T added to it, i.e., Vso(n−1)+Rup T, and the estimated vehicle speed Vso(n−1) at the previous cycle with the value obtained by multiplying the deceleration Rdw and the cycle period T subtracted from it, i.e., Vso(n−1)−Rdw T. In FIG. 5, "MED" designates a function for obtaining the intermediate value.

Figure 6:
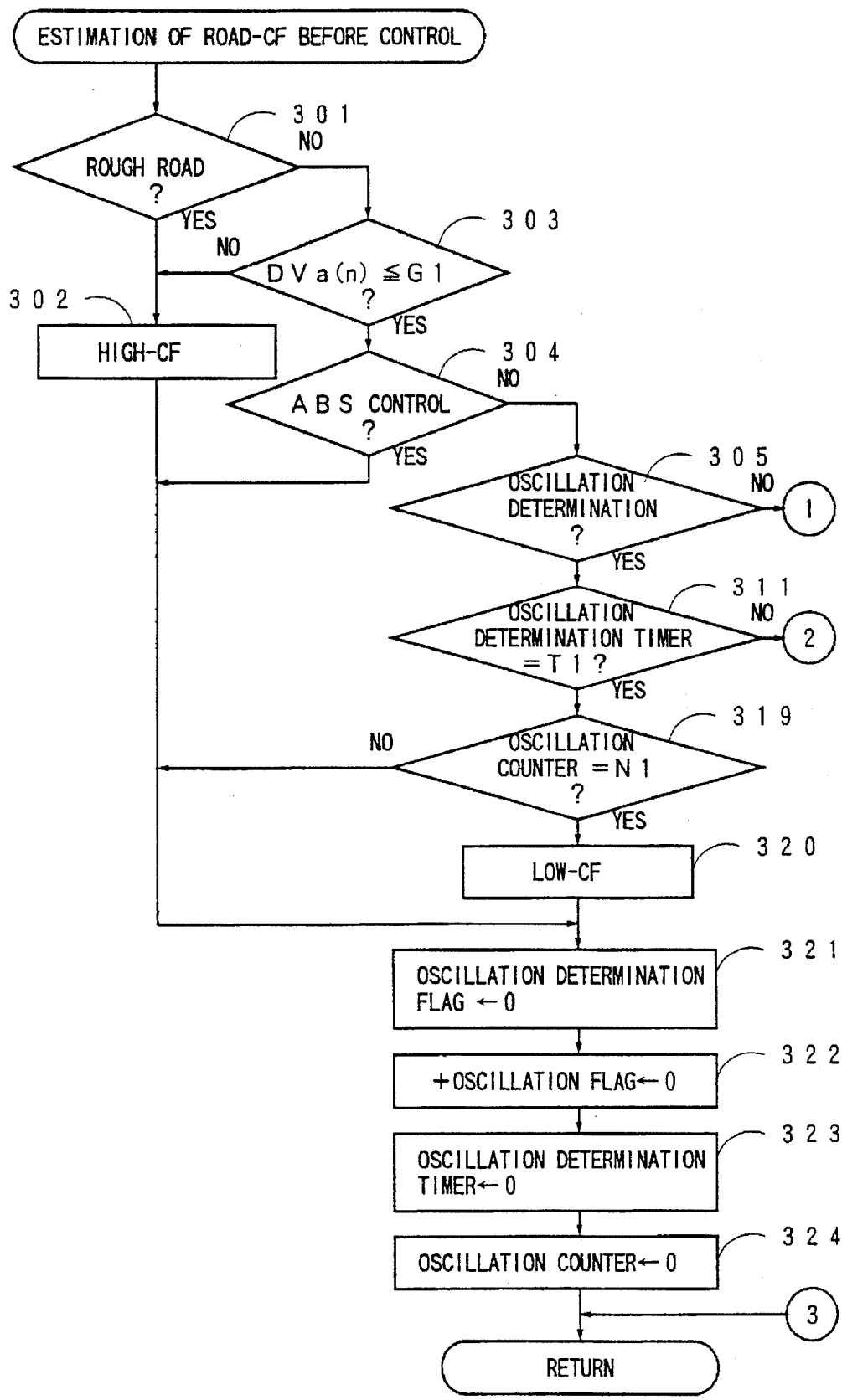
FIG. 6 is a flowchart showing the estimation of the coefficient of friction before the anti-skid control is initiated according to the above embodiment.
Figure 7:
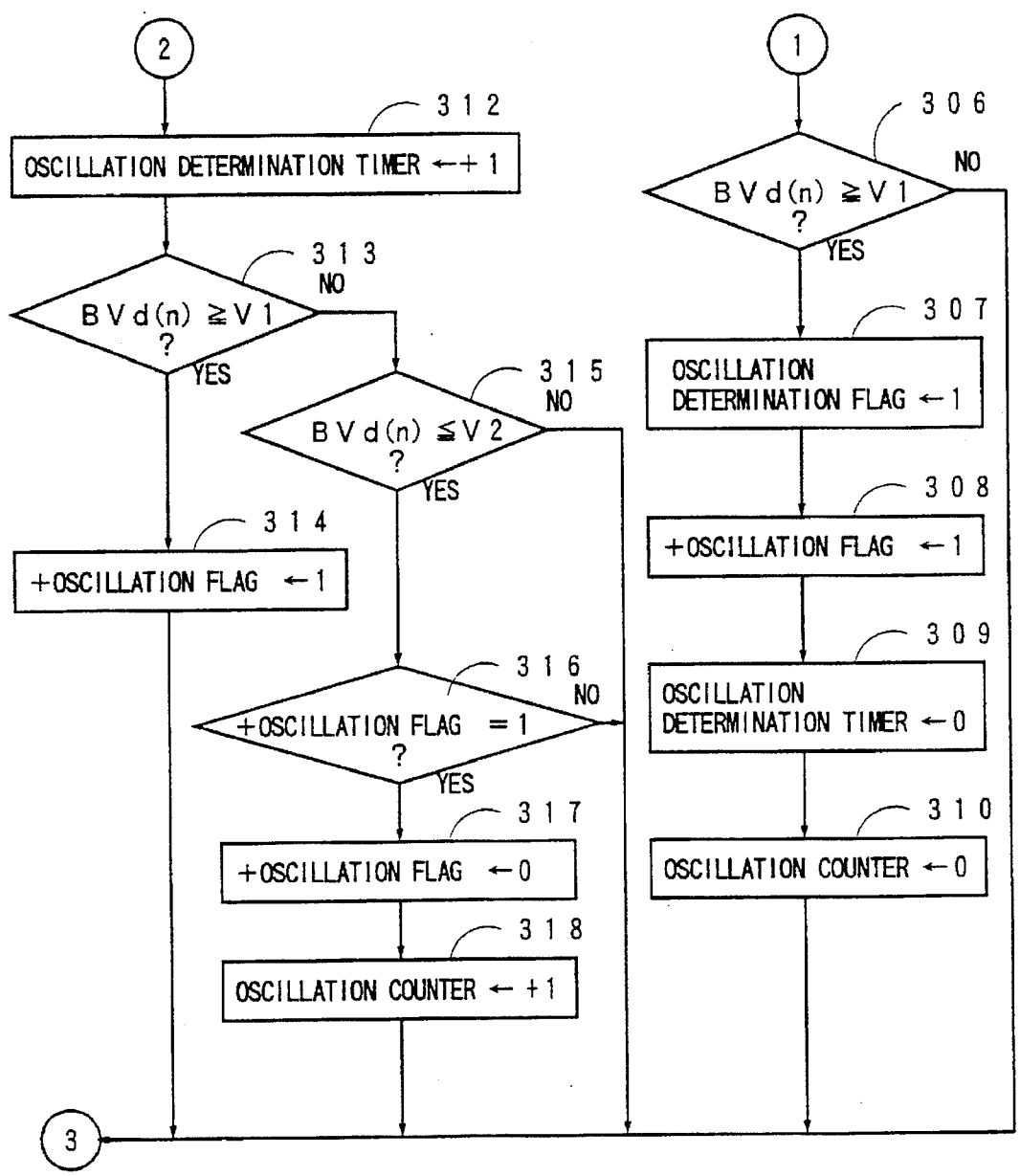
FIG. 7 is a flowchart showing the estimation of the coefficient of friction before the anti-skid control is initiated according to the above embodiment.
Figure 8:
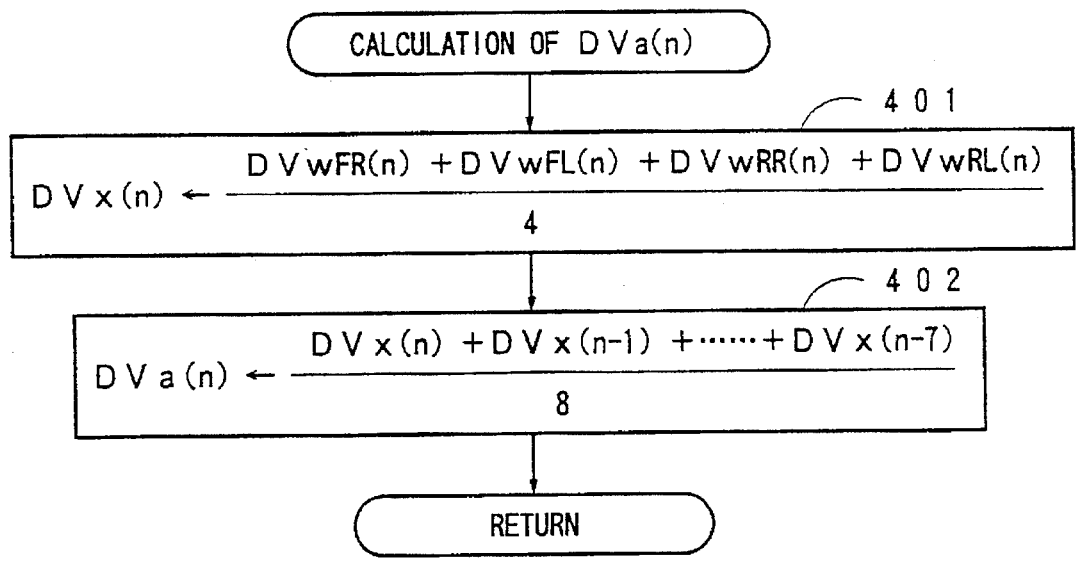
FIG. 8 is flowchart showing the calculation of the mean value of the wheel accelerations according to the above embodiment.
Figure 11:
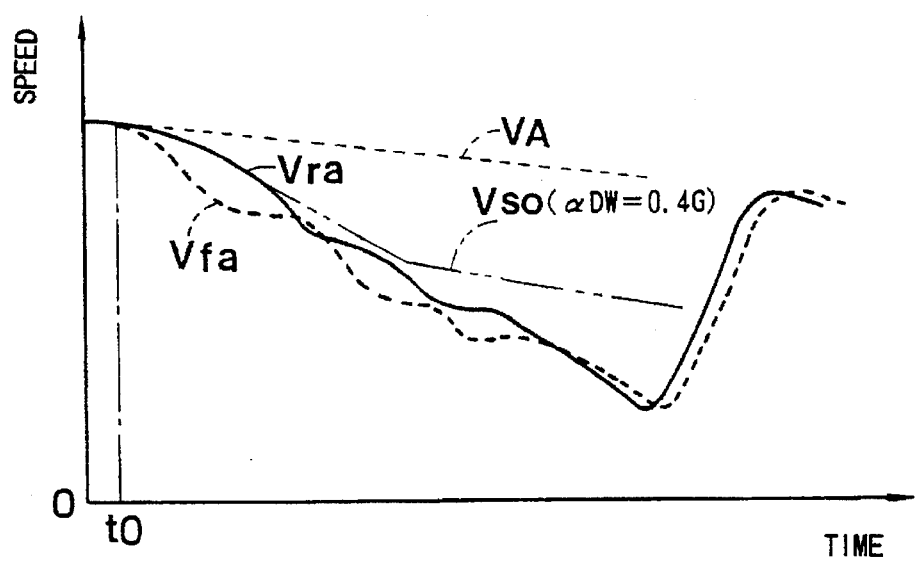
FIG. 11 is a diagram showing the relationship between the variations of front and rear wheel speeds in the above embodiment of the present invention.

FIGS. 6 and 7 show a flowchart which is provided for estimating the coefficient of friction of the road surface (i.e., the road-CF) before the anti-skid control is initiated. An example of its operation is explained with reference to FIG. 11, wherein a phantom line VA designates the actual vehicle speed, and a two-dotted chain line Vso designates the estimated vehicle speed. At the outset, it is determined at Step 301 whether the vehicle is running on a rough road or not, on the basis of the variation of each wheel speed, for example. If it is determined that the road is rough, the program proceeds to Step 302 where the control mode is set to the one provided for the high-CF road, so that the hydraulic pressure control is made in accordance with the control mode for the high-CF road. If it is determined at Step 301 that the road is not rough, the program proceeds to Step 303, where a mean acceleration DVa(n), which is obtained in accordance with the flowchart as shown in FIG. 8 and which will be described later in detail, is compared with the predetermined acceleration G1 (e.g., −0.3 G). When the mean acceleration DVa(n) is greater than the predetermined acceleration G1, the program proceeds to Step 302, otherwise (i.e., if DVa(n) is equal to or less than G1), it proceeds to Step 304 where it is determined if the anti-skid control operation has already started or not. If the anti-skid control operation has not started, the program proceeds to Step 305. However, if it has already started, the program returns to the main routine, after Steps 321 to 324 are executed.

It is determined at Step 305 whether an oscillation of a filtered speed differential BVd(n), which will be described later, is being determined or not. If the determination of the oscillation has not been made yet, the program proceeds to Step 306 in FIG. 7, where it is determined if the starting conditions are fulfilled or not. At Step 305, if it is determined that the determination of the oscillation is being made, the program proceeds to Step 311 where it is determined if a predetermined time T1 (e.g., 500 milliseconds) has lapsed after the determination of the oscillation has started. The conditions for starting the determination of the oscillation are provided at Steps 301, 303, 304 as shown in FIG. 6, and Step 306 as shown in FIG. 7. That is, the determination of the oscillation is initiated, provided that the vehicle is not running on the rough road, that the mean acceleration DVa(n) is not greater than the predetermined acceleration G1, that the anti-skid control operation has not started, and that the wheel speed differential BVd(n) which passed the band-pass filter (referred to as the filtered speed differential BVd(n)) is equal to or greater than a predetermined value V1 (e.g., 0.5 km/h), as determined at Step 306 in FIG. 7.

Figure 10:
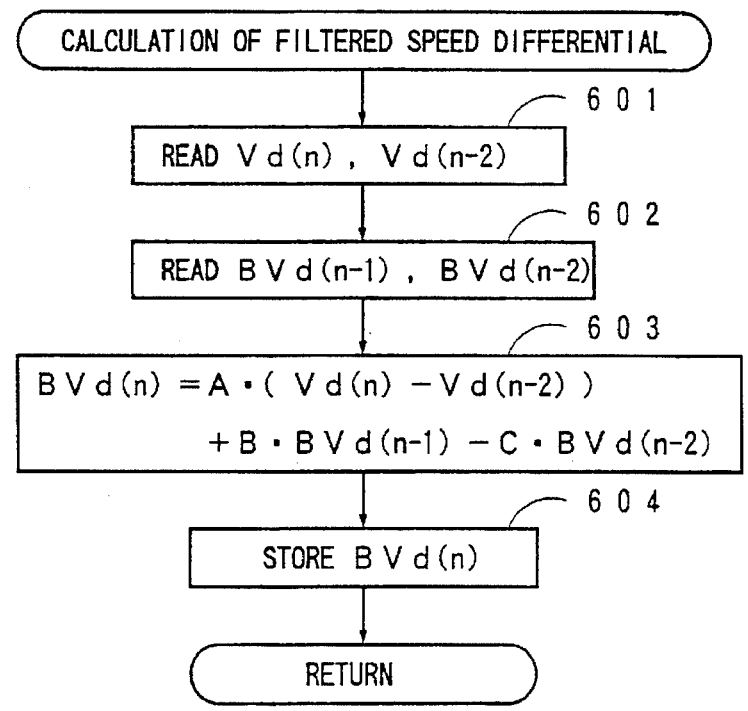
FIG. 10 is a flowchart showing the calculation of the filtered speed differential according to the above embodiment.
Figure 12:
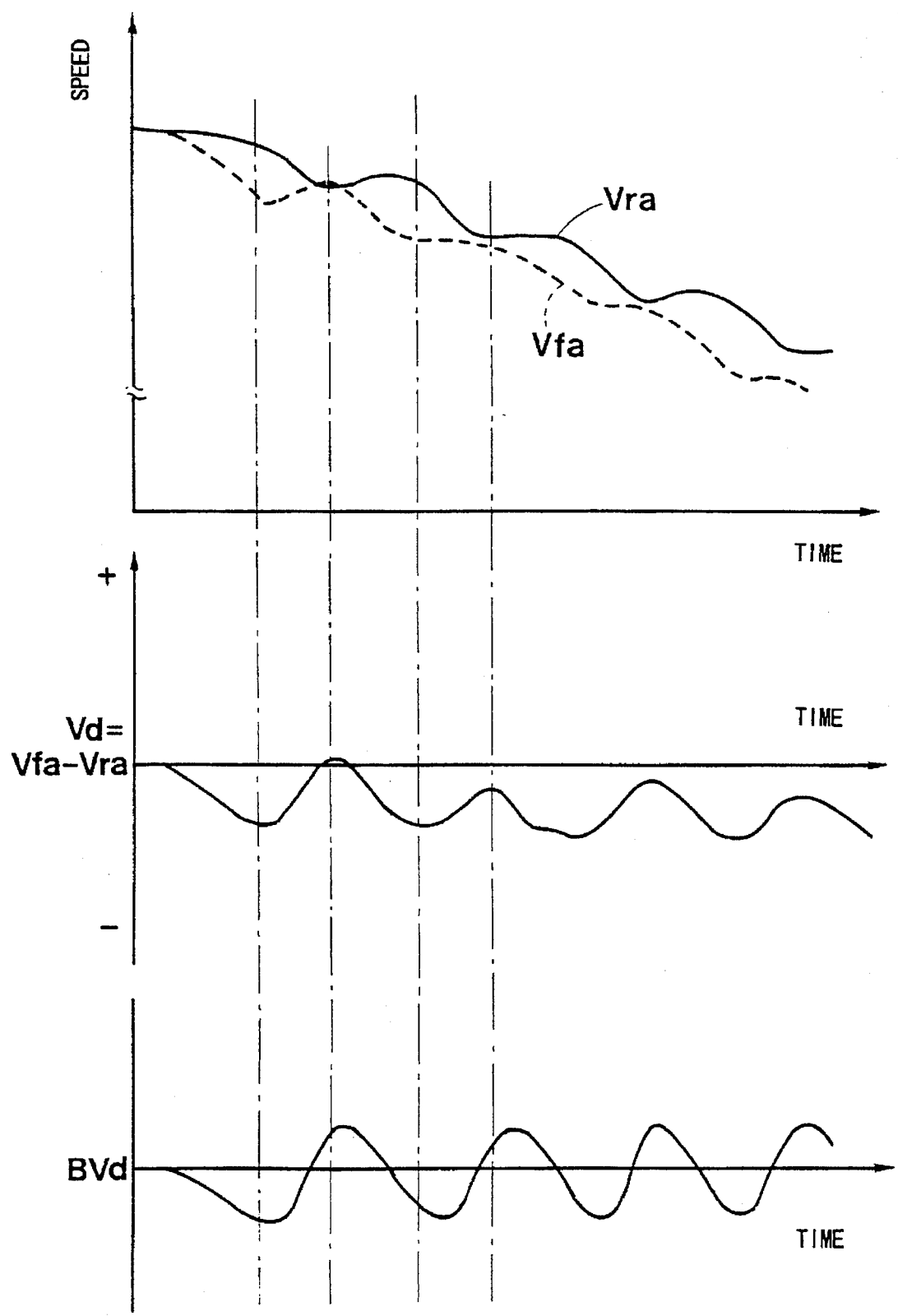
FIG. 12 is a diagram showing an oscillation of the wheel speed differential between the front and rear wheel speeds in the above embodiment.

The filtered speed differential BVd(n) as used at Step 306 and other steps is calculated according to a flowchart as shown in FIG. 10. At Steps 601, 602, the wheel speed differential Vd(n) which is obtained in the present cycle, and the wheel speed differential Vd(n−2) which was stored in one cycle before the previous cycle are read from the memory. Also, the filtered speed differential BVd(n−1) which was stored in the previous cycle and the filtered speed differential BVd(n−2) which was stored in one cycle before the previous cycle are read from the memory. Then, the filtered speed differential BVd(n) of the present cycle is calculated according to the equation as shown in Step 603 in FIG. 10, wherein "A", "B", "C" designate constants. For example, if cut-off frequencies for defining opposite ends of a passband are set to 6 Hz and 7 Hz, and a sampling period is set to 6 milliseconds, then 0.085 is provided for "A", 1.92 is provided for "B", and 0.98 is provided for "C", respectively. The filtered speed differential BVd(n) as calculated according to the equation at Step 603 is stored in the memory at Step 604, and renewed in order, so as to provide it for the calculation at the next cycle. The front mean speed Vfa and the rear mean speed Vra, the wheel speed differential Vd (=Vfa−Vra), and the filtered speed differential BVd are varied as shown in FIG. 12, from which it is clear that the filtered speed differential BVd is slightly delayed, comparing with the wheel speed differential Vd.

The filtered speed differential BVd(n) is compared with the predetermined value V1 at Step 306. If the differential BVd(n) is smaller than the value V1, the program returns to the main routine, otherwise the program proceeds to Step 307, where the determination of the oscillation is initiated. That is, the oscillation determination flag is set (1) at Step 307, and a +oscillation flag is set at Step 308. Then, the oscillation determination timer is cleared to be zero at Step 309, and the oscillation counter is cleared at Step 310.

Therefore, at the next cycle and the cycles following it, when the program proceeds to Step 305, it is determined that the determination of the oscillation is being made, so that the program proceeds to Step 311. If it is determined at Step 311 that the oscillation determination timer has not reached the predetermined time T1 (500 milliseconds), the program proceeds to Step 312 in FIG. 7 and the steps following it. That is, after the oscillation determination timer was incremented (i.e., +1) at Step 312, the filtered speed differential BVd(n) is compared with a predetermined value V1 (e.g., 0.5 km/h) at Step 313. If the filtered speed differential BVd(n) is equal to or greater than the value V1, the +oscillation flag is set at Step 314 and the program returns to the main routine. If it is determined that the filtered speed differential BVd(n) is smaller than the value V1, the program proceeds to Step 315 where the filtered speed differential BVd(n) is compared with a predetermined value V2 (e.g., −0.5 km/h). If the filtered speed differential BVd(n) exceeds the predetermined value V2, the program returns to the main routine, otherwise the program proceeds to Step 316. It is determined at Step 316 whether the +oscillation flag has been set or not. If the oscillation flag has not been set, the program returns to the main routine. If the +oscillation flag has been set, the oscillation flag is reset to zero at Step 317, and the oscillation counter is incremented (+1) at Step 318 to be counted up, so that the program returns to the main routine.

Referring back to Step 311 as shown in FIG. 6, if it is determined that the oscillation determination timer has reached the predetermined time T1 (500 milliseconds), the program further proceeds to Step 319, where it is determined whether the oscillation counter has counted a predetermined number of times N1 (e.g., three times, or six in frequency). If the result is affirmative, the program proceeds to Step 320 where the road surface is determined to be of the low-CF. Accordingly, the determination of the oscillation is terminated, so that the oscillation determination flag and the +oscillation flag are reset, the oscillation determination timer is cleared, and then the oscillation counter is cleared, at Steps 321 to 324, so that the program returns to the main routine.

Figure 9:
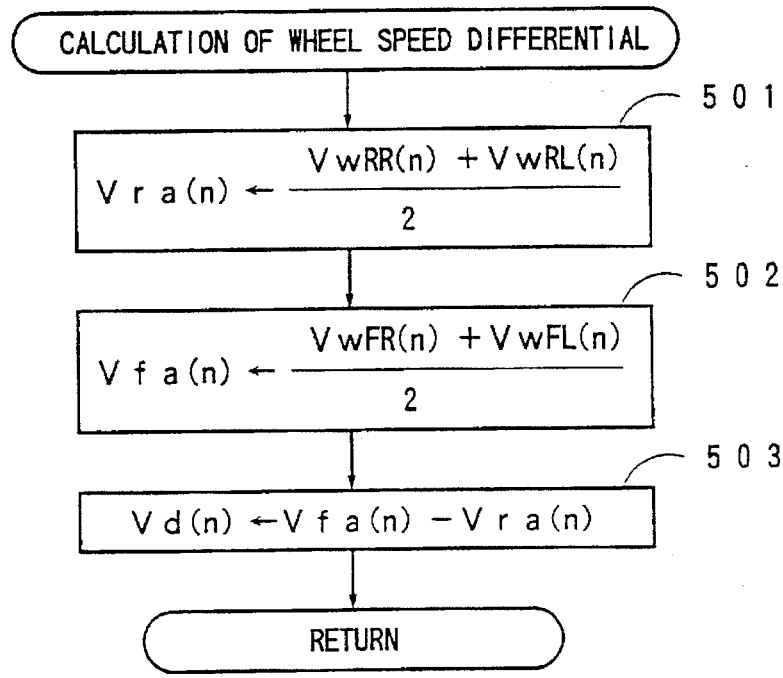
FIG. 9 is a flowchart showing the calculation of the wheel speed differential according to the above embodiment.

FIG. 8 shows a calculation of the mean acceleration DVa(n) used at Step 303 in FIG. 6. At Step 401, a mean value DVx(n) is obtained from the wheel accelerations DVwFR(n), DVwFL(n), DVwRR(n), DVwRL(n), which were calculated on the four road wheels FR, FL, RR, RL, respectively, at Step 103 in FIG. 4. Then, the mean values DVx of the data during eight cycles of (n−7) to (n) are averaged at Step 402 to provide a mean acceleration DVa(n) for the present cycle (n). The reason why the data of the eight cycles is averaged is that the mean value DVx(n) is varied in dependence upon the vibration of the road wheels or the like, so that the data are to be filtered to minimize a noise caused by the vibration or the like. FIG. 9 shows a calculation of a difference between the mean value of the wheel speed for the front road wheels and that for the rear road wheels, and its result is provided to Step 601 in FIG. 10. Namely, a mean value Vra(n) of the wheel speeds VwRR(n), VwRL(n) of the rear road wheels RR, RL is calculated at Step 501, and a mean value Vfa(n) of the wheel speeds VwFR(n), VwFL(n) of the front road wheels FR, FL is calculated at Step 502. Then, a speed differential Vd(n) between the mean value Vfa(n) and the mean value Vra(n) is calculated at Step 503.

According to the present embodiment as described above, therefore, the low-CF road surface can be estimated correctly before the hydraulic pressure control is initiated, so that an appropriate hydraulic pressure control can be provided from its early stage. Especially, even in the case where all of the road wheels tend to be locked simultaneously by the gradual braking operation, the low-CF road surface can be estimated in advance, so that the hydraulic pressure control can be made properly in accordance with the estimation of the low-CF road surface.

Figure 13:
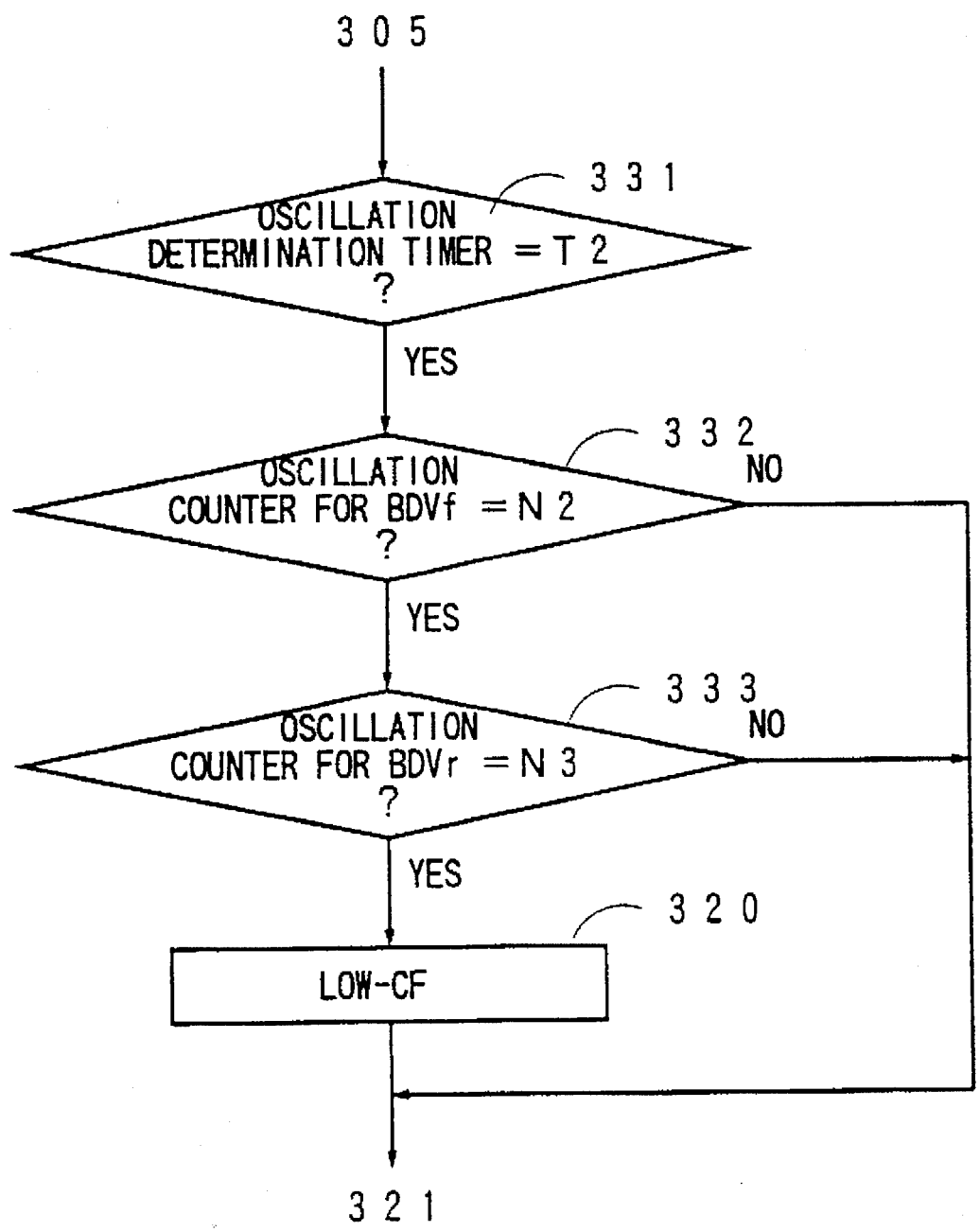
FIG. 13 is a part of flowchart for estimating the coefficient of friction before the anti-skid control is initiated according to another embodiment of the present invention.
Figure 14:
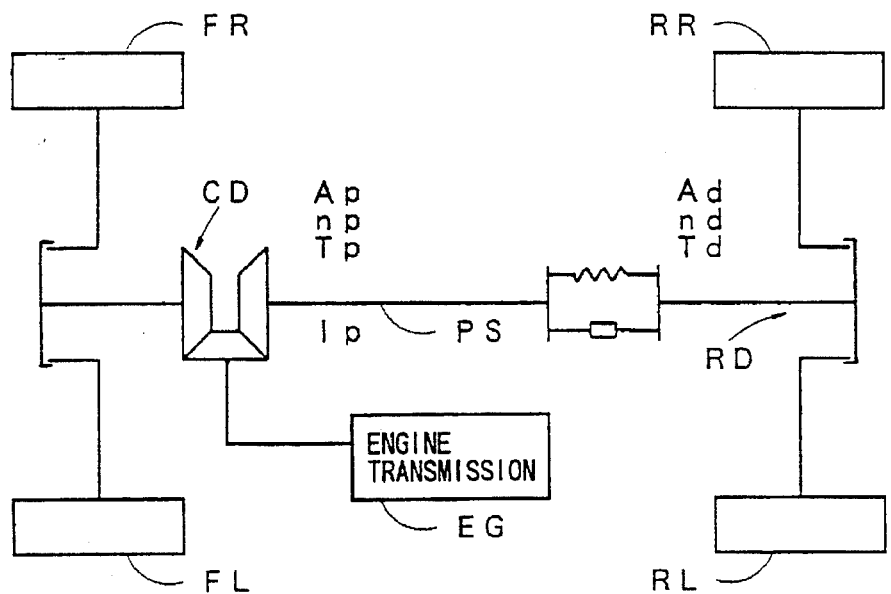
FIG. 14 is a block diagram illustrating a conventional four-wheel drive vehicle.
Figure 15:
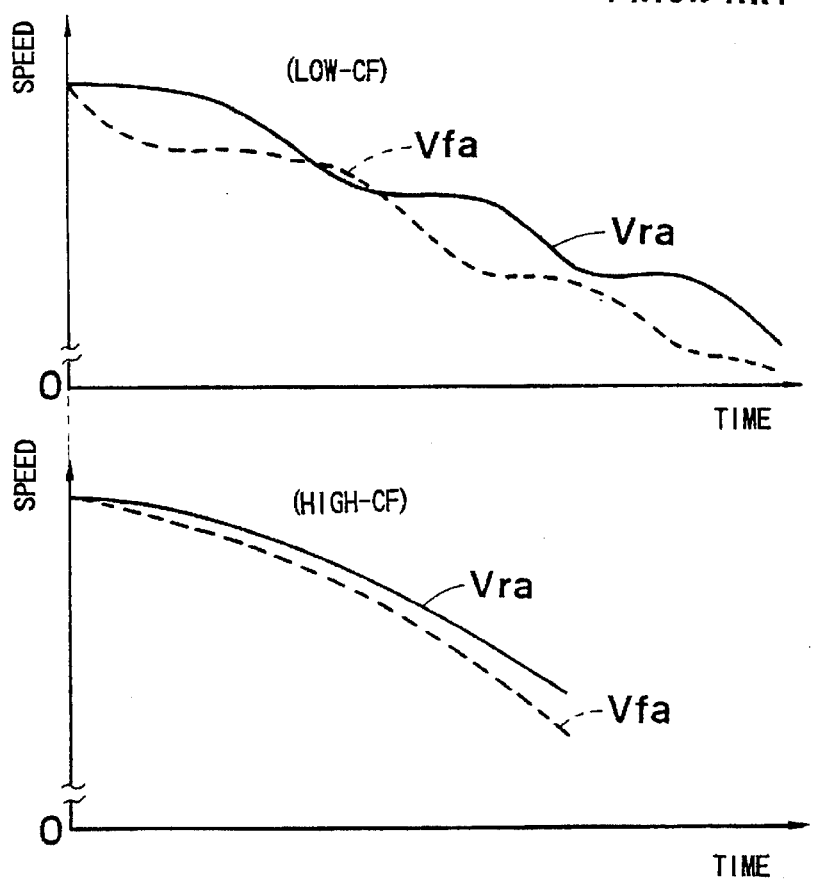
FIG. 15 is a diagram showing an oscillation of the speed differential between the front and rear road wheels according to a conventional braking apparatus employed in the prior four-wheel drive vehicle.

FIG. 13 is a flowchart according to another embodiment of the present invention, wherein the first and second band-pass filters are provided for the front and rear road wheels, respectively, and wherein a front mean acceleration DVf for the front road wheels FR, FL is calculated, then a rear mean acceleration DVr for the rear road wheels RR, RL is calculated, and then the filtered accelerations BDVf, BDVr which passed the first and second band-pass filters, respectively, are obtained. In FIG. 13, the estimation of the coefficient of friction before the anti-skid control, which corresponds to that shown in FIG. 6, is made in a similar fashion to that in FIG. 6, so that Steps preceding Step 305 and Steps following Step 321 are omitted in FIG. 13, and also omitted are Steps as shown in FIG. 7. Accordingly, it is determined at Steps 332, 333 whether the filtered accelerations BDVf, BDVr have reached to the predetermined numbers of oscillations N2, N3 (e.g., three for both of N2, N3, or six in frequency) during a predetermined period of time T2 (e.g., 500 milliseconds), which is determined at Step 331 as done at Step 311 in FIG. 6, the program proceeds to Step 320 where the road surface is estimated to be of the low-CF. Thus, the low-CF road surface can be estimated according to the filtered accelerations BDVf, BDVr.

It should be apparent to one skilled in the art that the above-described embodiments are merely illustrative of but a few of the many possible specific embodiments of the present invention. Numerous and various other arrangements can be readily devised by those skilled in the art without departing from the spirit and scope of the invention as defined in the following claims.

What is claimed is:

1. An anti-skid control system for controlling a braking force applied to front and rear road wheels of a four-wheel drive vehicle, comprising:

wheel brake cylinders operatively connected to said front and rear road wheels, respectively, for applying braking force thereto;

a hydraulic pressure generator for supplying a hydraulic braking pressure to each of said wheel brake cylinders;

actuating means disposed in each hydraulic circuit communicating said hydraulic pressure generator with each of said wheel brake cylinders for controlling the hydraulic braking pressure in each of said wheel brake cylinders;

wheel speed detection means for detecting wheel speeds of said front and rear road wheels, and providing output signals corresponding to the wheel speeds, respectively;

wheel acceleration calculation means for calculating an acceleration of each road wheel on the basis of the wheel speeds detected by said wheel speed detection means;

speed differential calculation means for calculating a wheel speed differential between a front wheel speed and a rear wheel speed calculated on the basis of the output signals of the wheel speed detection means;

oscillation determination means for determining a presence of an oscillation of the wheel speed differential calculated by said speed differential calculation means;

coefficient of friction estimation means for estimating a coefficient of friction of a road on which said vehicle is running, in accordance with a determination made by said oscillation determination means; and braking force control means for controlling said actuating means in accordance with at least the coefficient of friction estimated by said coefficient of friction estimation means, and in response to the wheel speeds detected by said wheel speed detection means, thereby to control the braking force applied to each of said road wheels.

2. An anti-skid control system as claimed in claim 1, further comprising:

mean acceleration calculation means for calculating a mean value of the wheel accelerations for all of said road wheels obtained by said wheel acceleration calculation means, to provide a mean wheel acceleration;

front mean speed calculation means for calculating a mean value of the wheel speeds of said front road wheels on the basis of the wheel speeds detected by said wheel speed detection means, to provide a front mean speed;

rear mean speed calculation means for calculating a mean value of the wheel speeds of said rear road wheels on the basis of the wheel speeds detected by said wheel speed detection means, to provide a rear mean speed;

wherein said speed differential calculation means calculates a difference between the front mean speed and the rear mean speed calculated by said front mean speed calculation means and said rear mean speed calculation means, respectively, to provide the wheel speed differential; and wherein said coefficient of friction estimation means estimates that the coefficient of friction of said road is relatively low when the mean wheel acceleration calculated by said mean acceleration calculation means is less than a predetermined mean acceleration, and when said oscillation determination means determines that a frequency of oscillation of the wheel speed differential exceeds a predetermined frequency during a predetermined period.

3. An anti-skid control system as claimed in claim 2, further comprising:

vehicle speed estimation means for calculating an estimated vehicle speed on the basis of the wheel speeds detected by said wheel speed detection means, and providing the estimated vehicle speed to said braking force control means;

wherein said vehicle speed estimation means includes means for modifying the estimated vehicle speed in accordance with the output of said coefficient of friction estimation means, and wherein said braking force control means controls said actuating means in accordance with the estimated vehicle speed modified by said modifying means and the wheel speeds detected by said wheel speed detection means.

4. An anti-skid control system as claimed in claim 1, further comprising:

band-pass filter means for passing the wheel speed differential having an oscillation property within a predetermined band of frequencies, out of the wheel speed differentials calculated by said speed differential calculation means, wherein said coefficient of friction estimation means estimates that the coefficient of friction of said road is relatively low when the wheel acceleration calculated by said wheel acceleration calculation means is less than a predetermined acceleration, and when said oscillation determination means determines that an amplitude of oscillation of the wheel speed differential passed through said band-pass filter means exceeds a predetermined value, and that a frequency of oscillation of the wheel speed differential exceeds a predetermined frequency during a predetermined period.

5. An anti-skid control system for controlling a braking force applied to front and rear road wheels of a four-wheel drive vehicle, comprising:

wheel brake cylinders operatively connected to said front and rear road wheels, respectively, for applying braking force thereto;

a hydraulic pressure generator for supplying a hydraulic braking pressure to each of said wheel brake cylinders;

actuating means disposed in each hydraulic circuit communicating said hydraulic pressure generator with each of said wheel brake cylinders for controlling the hydraulic braking pressure in each of said wheel brake cylinders;

wheel speed detection means for detecting wheel speeds of said front and rear road wheels, and providing output signals corresponding to the wheel speeds, respectively;

wheel acceleration calculation means for calculating an acceleration of each road wheel on the basis of the wheel speeds detected by said wheel speed detection means;

speed differential calculation means for calculating a wheel speed differential between a front wheel speed and a rear wheel speed calculated on the basis of the output signals of the wheel speed detection means;

oscillation determination means for determining a presence of an oscillation of the wheel speed differential calculated by said speed differential calculation means;

coefficient of friction estimation means for estimating a coefficient of friction of a road on which said vehicle is running in accordance with a determination made by said oscillation determination means;

mean acceleration calculation means for calculating a mean value of the wheel accelerations for all of said road wheels obtained by said wheel acceleration calculation means, to provide a mean wheel acceleration;

front mean acceleration calculation means for calculating a mean value of the wheel accelerations of said front road wheels calculated by said wheel acceleration calculation means, to provide a front mean acceleration;

rear mean acceleration calculation means for calculating a mean value of the wheel accelerations of said rear road wheels calculated by said wheel acceleration calculation means, to provide a rear mean acceleration;

first band-pass filter means for passing the front mean acceleration having an oscillation property within a predetermined band of frequencies, out of the front mean accelerations calculated by said front mean acceleration calculation means; and second band-pass filter means for passing the rear mean acceleration having an oscillation property within a predetermined band of frequencies, out of the rear mean accelerations calculated by said rear mean acceleration calculation means, wherein said coefficient of friction estimation means estimates that the coefficient of friction of said road is relatively low when the mean wheel acceleration calculated by said mean acceleration calculation means becomes less than a predetermined mean acceleration, and when said oscillation determination means determines that the front and rear mean accelerations passed through said first and second band-pass filter means exceed predetermined values, respectively, and that the frequencies of oscillations of the front and rear mean accelerations exceed predetermined frequencies during a predetermined period, respectively.

* * * * *